(12) United States Patent
Ozawa et al.

(10) Patent No.: US 6,626,483 B2
(45) Date of Patent: Sep. 30, 2003

(54) FRONT END STRUCTURE FOR VEHICLE

(75) Inventors: Ikuo Ozawa, Toyoake (JP); Noriaki Maeda, Kariya (JP); Norihisa Sasano, Ama-gun (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/822,601

(22) Filed: Mar. 30, 2001

(65) Prior Publication Data

US 2001/0026081 A1 Oct. 4, 2001

(30) Foreign Application Priority Data

Apr. 3, 2000 (JP) ........................................ 2000-100690

(51) Int. Cl.$^7$ ............................................... B62D 25/08
(52) U.S. Cl. .................. 296/194; 296/203.02; 296/208; 180/68.1
(58) Field of Search ............................. 296/194, 203.02, 296/208, 203.01, 193; 180/68.1, 68.3

(56) References Cited

U.S. PATENT DOCUMENTS

| | | | | |
|---|---|---|---|---|
| 4,533,012 A | * | 8/1985 | Komoda | 123/41.49 |
| 4,932,490 A | * | 6/1990 | Dewey | 180/68.3 |
| 5,141,068 A | * | 8/1992 | Mendicino | 180/68.3 |
| 5,257,172 A | * | 10/1993 | Erickson | 362/226 |
| 5,860,685 A | * | 1/1999 | Horney et al. | 180/68.1 |
| 2001/0026082 A1 | * | 10/2001 | Ozawa et al. | 296/194 |

FOREIGN PATENT DOCUMENTS

| | | |
|---|---|---|
| JP | A-10-329754 | 12/1998 |
| JP | A-11-171041 | 6/1999 |

* cited by examiner

*Primary Examiner*—D. Glenn Dayoan
*Assistant Examiner*—Patricia Engle
(74) *Attorney, Agent, or Firm*—Harness, Dickey & Pierce, PLC

(57) ABSTRACT

When the suction opening portion 121 is covered with the decoration grill 300 from the front side of a vehicle, the suction chamber 140 filled with air is formed on the front side of the suction opening portion 121, and the communication passage 141 to connect the suction chamber 140 with the outside of the suction chamber 140 in a direction perpendicular to the longitudinal direction of the vehicle is formed into a labyrinth structure by the decoration grill 300, bumper cover 410 and front end panel 100. Due to the above structure, it is possible to supply air, which has been sucked from the outside of the engine compartment, to the engine while foreign material, such as rain water and snow, is prevented from being sucked into the engine.

8 Claims, 4 Drawing Sheets

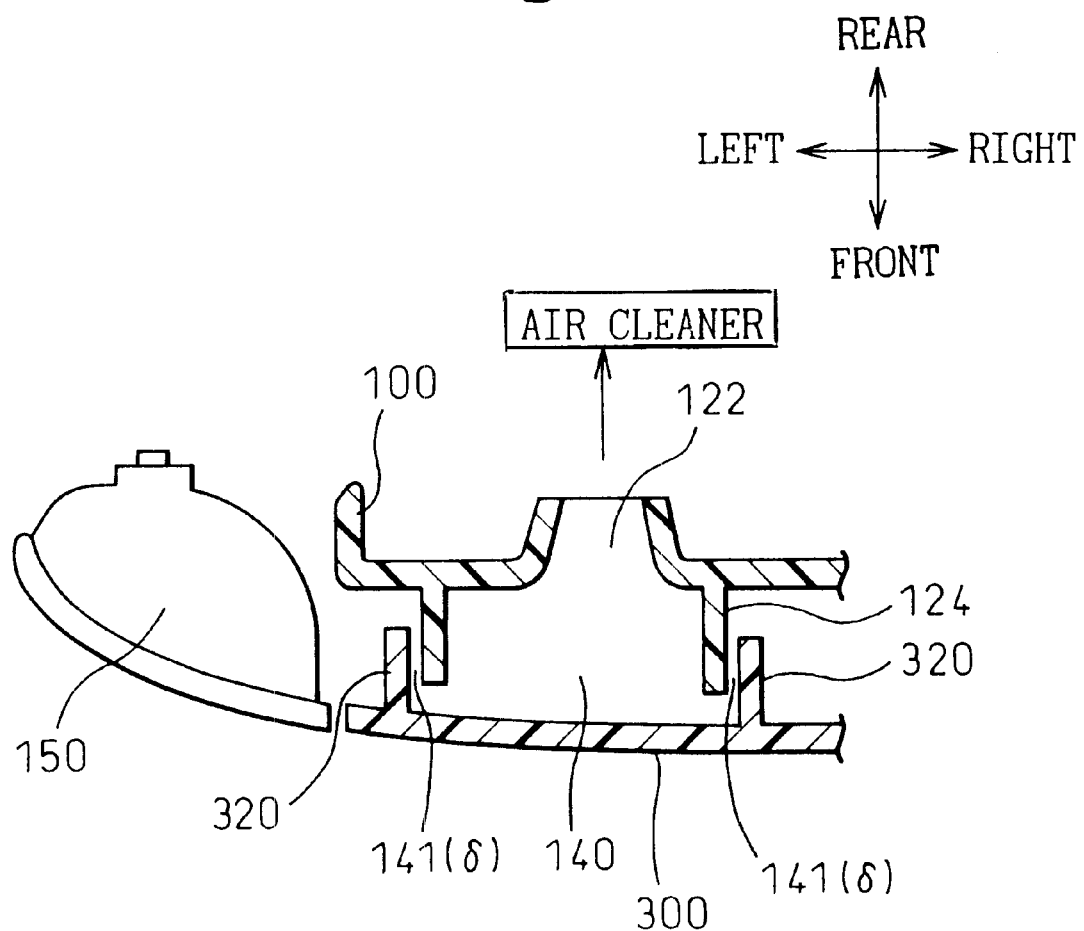

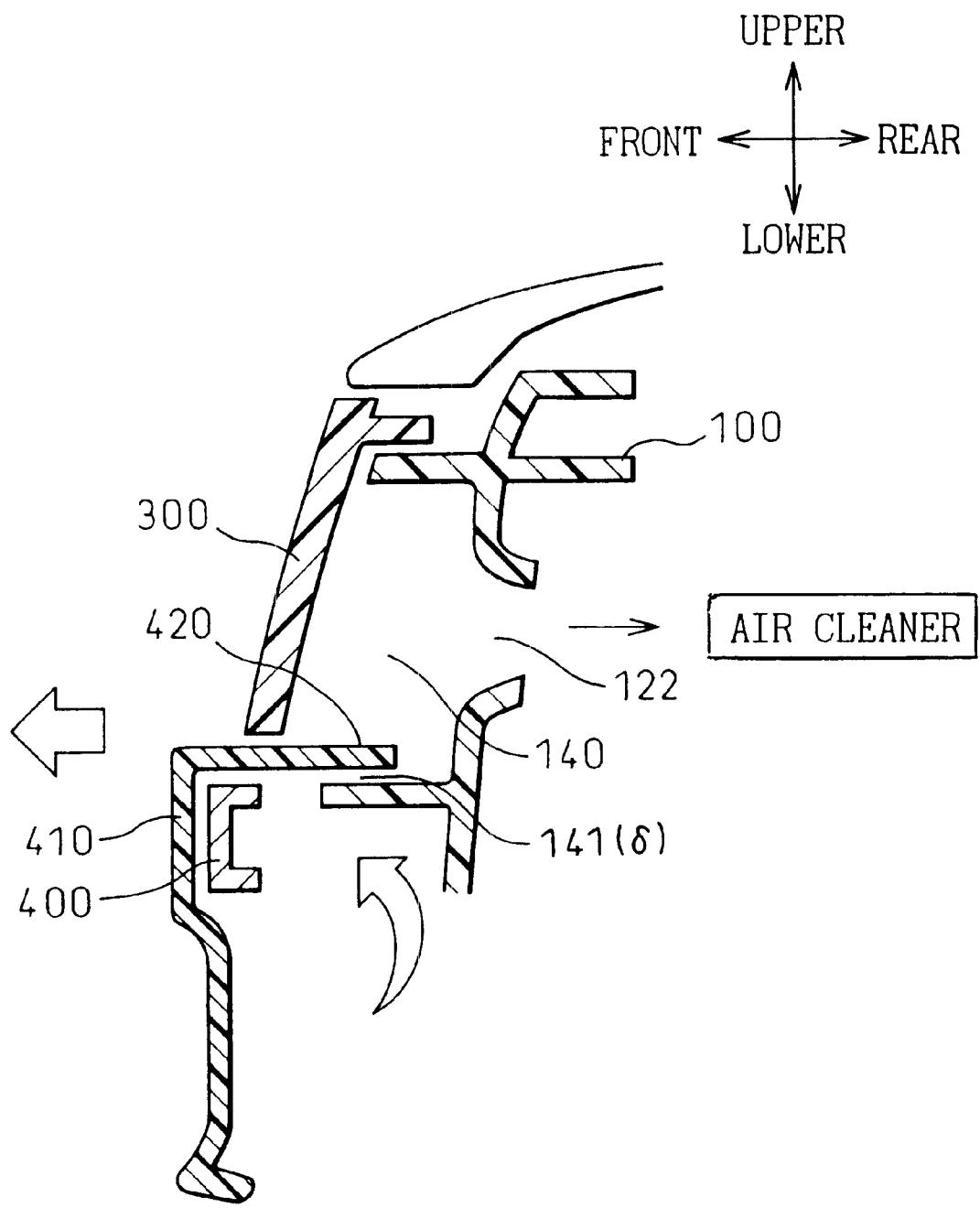

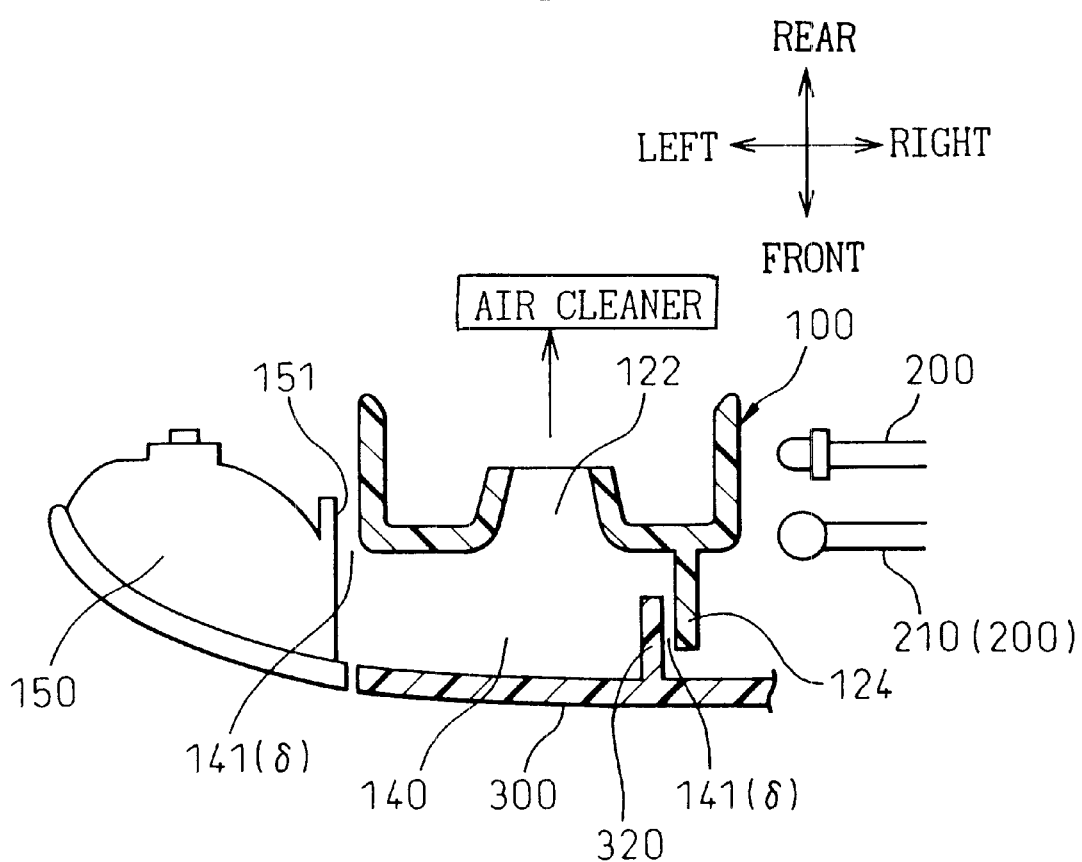

FRONT END STRUCTURE FOR VEHICLE

BACKGROUND OF THE INVENTION

1. Field of the Invention

The present invention relates to a front end structure of a vehicle comprising a front end panel which is arranged at a front end portion of the vehicle and divides the front end portion into an engine compartment, into which an internal combustion engine is incorporated, and an outside of the engine compartment.

2. Description of the Related Art

In general, a suction port of a suction duct from which air is sucked into an engine is open to an engine compartment so that foreign material such as rain water and snow can not be sucked into the suction duct (engine).

However, since the atmospheric temperature in the engine compartment is higher than that outside of the engine compartment, when air is sucked from the engine compartment into the engine, the temperature of the air is high and the density of air (oxygen) is low. Therefore, the engine efficiency (output) is lowered.

When the suction port is arranged outside the engine compartment, and air is sucked from the outside of the engine, there is a possibility that the foreign material, such as rain water and snow, is sucked into the engine.

SUMMARY OF THE INVENTION

The present invention has been accomplished in view of the above circumstances. It is an object of the present invention to supply air, which has been sucked from the outside of an engine compartment, into the engine while the suction of foreign material such as rain water and snow into the engine is prevented.

In order to accomplish the above object, an embodiment of the present invention is a front end structure of a vehicle comprising a front end panel (100) which is arranged at a front end portion of the vehicle and divides the front end portion into an engine compartment, into which an internal combustion engine is incorporated, and an outside of the engine compartment, the front end panel (100) comprising: a suction opening portion (122) in which suction air sucked into the internal combustion engine flows and which communicates the engine compartment with the outside of the engine compartment; and a cover member (300, 410, 151) for forming a suction chamber (140) in which the sucked air is filled, the cover member being arranged on the front side of the suction opening portion (122) in such a manner that the cover member covers the suction opening portion (122) from the front side of the vehicle, wherein the suction chamber (140) is communicated with the outside of the suction chamber (140) in a direction perpendicular to the longitudinal direction of the vehicle, and a communicating passage (141) to communicate the suction chamber (140) with the outside of the suction chamber (140) is formed into a labyrinth structure composed of the cover member (300, 410, 151) and the front end panel (100).

Due to the above structure, it is possible to supply air, which has been sucked from the outside of an engine compartment, into an internal combustion engine while foreign material, such as rain water and snow, is prevented from being sucked into the internal combustion engine.

Another embodiment of the present invention is a front end structure of a vehicle comprising: a front end panel (100) which is arranged at a front end portion of the vehicle and divides the front end portion into an engine compartment, into which an internal combustion engine is incorporated, and an outside of the engine compartment; a decoration grill (300) for forming a decoration profile of the front end portion of the vehicle, arranged on the front side of the front end panel (100); and a bumper cover (410) to cover a bumper reinforcement (400) for absorbing a shock, the front end panel (100) comprising: a suction opening portion (122) in which air sucked into the internal combustion engine flows and which communicates the engine compartment with the outside of the engine compartment; and a suction chamber (140) in which the sucked air is filled, formed on the front side of the suction opening portion (122) when the suction opening portion (122) is covered with the decoration grill (300) from the front side of the vehicle, wherein the suction chamber (140) is communicated with the outside of the suction chamber (140) in a direction perpendicular to the longitudinal direction of the vehicle, and a communicating passage (141) to communicate the suction chamber (140) with the outside of the suction chamber (140) is formed into a labyrinth structure composed of the decoration grill (300), the front end panel (100) and the bumper cover (410).

The present invention may be more fully understood from the description of preferred embodiments of the invention set forth below, together with the accompanying drawings.

BRIEF DESCRIPTION OF THE DRAWINGS

In the drawings:

FIG. 2 is a cross-sectional view taken on line A—A in FIG. 1;

FIG. 3 is a cross-sectional view taken on line B—B in FIG. 1; and

FIG. 4 is a cross-sectional view corresponding to the cross-sectional view taken on line A—A in FIG. 1 in the front end structure of a vehicle according to a second embodiment of the present invention.

DESCRIPTION OF THE PREFERRED EMBODIMENTS

First Embodiment

Figure 1:
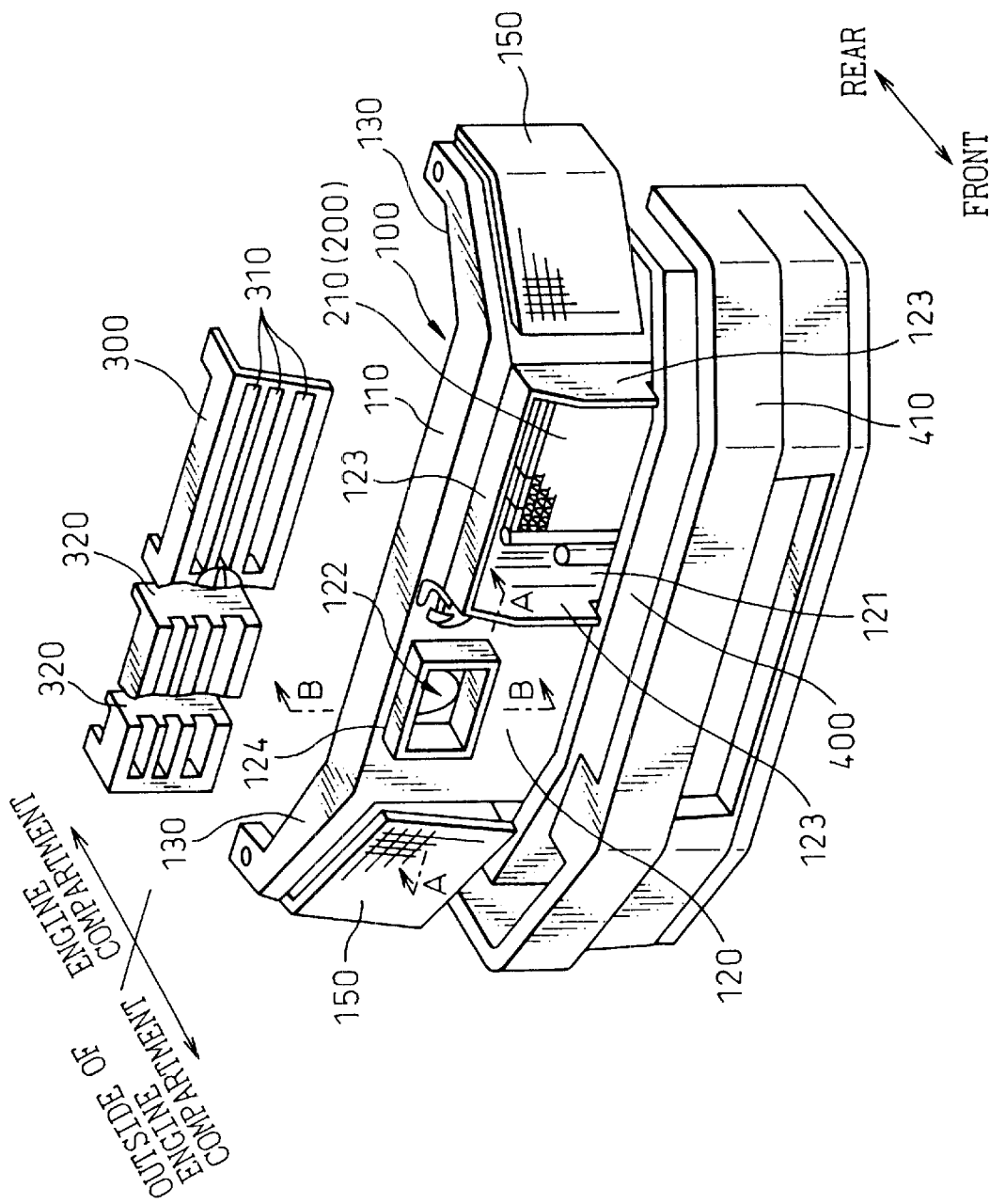
FIG. 1 is an exploded perspective view showing a front end structure of a vehicle according to a first embodiment of the present invention.

FIG. 1 is an exploded perspective view showing a front end structure of a vehicle according to an embodiment of the present invention. Reference numeral 100 is a front end panel (carrier) made of resin (glass reinforced polypropylene in this embodiment) arranged on a front end portion of a vehicle so as to divide the front end portion into an engine compartment, into which an engine (not shown) is incorporated, and an outside of the engine compartment. The front end panel 100 is fixed to a body (side member) on the side of the vehicle via a detachable fastening means (not shown) such as bolts.

In this connection, the front end panel 100, which will be referred to as a panel hereinafter in this specification, includes: an upper beam member 110 arranged on the upper side and extending in the vehicle width direction (horizontal direction); a lower beam member (not shown) arranged on the lower side and extending in the vehicle width direction; a first and a second pillar portion (not shown) extending in the upward and downward direction and connecting both the beam member 110 and the lower beam; a vertical wall portion 120 connecting both the beam members 110 with both the pillar portions, the vertical wall portion extending in the vertical and the horizontal direction; and bracket portions 130 for fixing the panel 100 to the vehicle body when the bracket portions 130 extend from the upper end side of the first and the second pillar portion to the side of the vehicle, wherein these components are made of resin and molded into one body. In this connection, headlights 150 to illuminate in front of the vehicle are incorporated into the bracket portions 130.

The vertical wall portion 120 includes: a cooling wind introduction port 121 for introducing a cooling wind (air outside the engine room) into a heat exchanger 200 such as an outside heat exchanger 210 (condenser and radiator) of an air conditioner for vehicle use and a radiator for cooling coolant to cool an engine; and a suction opening portion 122 in which air flows so that it can be sucked into the engine, wherein the suction opening portion 122 communicates the engine compartment with the outside of the engine compartment. In this connection, after the air has passed through the suction opening portion 122, it is sucked into the engine via a suction duct and an air cleaner the detail of which is not shown in the drawing.

In this connection, reference numeral 123 is a guide duct portion for guiding a cooling wind, which has passed through a decoration grill 300 described later, into the cooling wind introduction port 121. Reference numeral 124 is a rectangular frame-shaped panel chamber wall composing a suction chamber described later. These components 123, 124 are made by integrally molding them with the panel 100.

Reference numeral 300 is a decoration grill (referred to as a grill hereinafter) made of resin (ABS resin in this embodiment) for composing a decoration profile of the front end portion of the vehicle, arranged on the front side of the vehicle with respect to the panel 100 and incorporated into the panel 100. In a portion of the grill 300 opposed to the cooling wind introduction port 121, a slit-shaped opening portion 310 for introducing a cooling wind is formed.

Reference numeral 400 is a metallic bumper reinforcement (referred to as a bumper hereinafter), which is arranged on the front end side of the vehicle so as to absorb a shock acting on the front end portion of the vehicle. Reference numeral 410 is a bumper cover made of resin (polypropylene in this embodiment) for covering the bumper 400.

In this connection, a portion of the grill 300 opposed to the suction opening portion 122 is different from a portion of the grill 300 opposed to the cooling wind introduction port 121. As shown in FIGS. 2 and 3, the portion of the grill 300 opposed to the suction opening 122 is formed into a wall on which the opening portion 310 is not formed. When this wall-shaped grill 300 covers the suction opening portion 121 from the front side of the vehicle, the suction chamber 140, in which contains air, is formed on the front side of the suction opening portion 121.

The grill chamber wall portion 320 formed integrally with the grill 300 and protruded from the grill 300 to the panel 100 side, the panel chamber wall 124 and the bumper chamber wall 420 formed integrally with the bumper cover 410 and protruded from the bumper cover 410 to the panel 100 side to form the suction chamber 140 into a substantially closed space.

In this connection, in FIG. 1, the grill 300 is drawn as if it were divided into a portion in which the opening portion 210 is formed and a portion in which the opening portion 210 is not formed. In order to facilitate the understanding of the existence of the grill chamber wall portion 320, the grill 300 is drawn in such a manner as shown in FIG. 1. Actually, the grill 300 is one part integrated into one body.

The grill chamber wall portion 320 and the panel chamber wall 124, and the bumper chamber wall 420 and the panel chamber wall 124 are respectively arranged being opposed to each other while gap δ is left between them. The suction chamber 140 and the outside of the suction chamber 140 communicate with each other via this gap δ. Therefore, this gap δ connects the suction chamber 140 with the outside of the suction chamber 140 and functions as a communication passage 141 having a labyrinth structure.

In this connection, as well known, the labyrinth structure is composed in such a manner that a least one portion in the passage from the entry side to the delivery side is bent so that fluid can not linearly flow in the passage.

Next, the characteristic of the present invention will be explained below.

According to the embodiment, when the grill 300 covers the suction opening portion 121 from the front side of the vehicle, the suction chamber 140 filled with suction air is formed on the front side of the suction opening portion 121. Further, the communication passage 141 to communicate the suction chamber 140 with the outside of the suction chamber 140 in a direction perpendicular to the longitudinal direction of the vehicle is formed into a labyrinth structure. Therefore, it is possible to supply air, which has been sucked from the outside of the engine compartment, to the engine while foreign objects such as rain water and snow are prevented from being sucked into the engine.

The suction chamber 140 and the communication passage 141 having a labyrinth structure are composed of existing parts such as the grill 300 and the bumper cover 410. Therefore, it is possible to supply air, which has been sucked from the outside of the engine compartment, to the engine without using an excessively complicated structure of the front end portion of the vehicle while foreign objects such as rain water and snow are prevented from being sucked into the engine.

Second Embodiment

In the first embodiment, the grill 300 and the bumper cover 410 are used as cover members for forming the suction chamber 140 in such a manner that the cover members cover the suction opening portion 122 from the front side of the vehicle. However, in this second embodiment, as shown in FIG. 4, in addition to the grill 300 and the bumper cover 410, the cover member is composed of a light housing (headlight housing) 151 of the headlight 150 fixed to the bracket portion 130. In this connection, the light housing 151 is an object composing a profile of the headlight 150 such as a reflecting mirror and lens.

Accordingly, in this embodiment, the wall portion of the suction chamber 140 in the vehicle width direction is composed of the light housing 151, and the communication passage 141 is formed which has a labyrinth structure composed of gap δ formed among the light housing 151, the grill 300 and the panel 100.

In the above embodiment, the panel 100, the grill 300 and the bumper cover 410 are made of resin, however, it should be noted that the present invention is not limited to the above specific embodiment, that is, the panel 100, the grill 300 and the bumper cover 410 may be made of metal or another material.

In the above embodiment, the existing parts of the grill 300, bumper cover 410 and light housing 151 are used as cover members for forming the suction chamber 140 in such a manner that the cover members cover the suction opening portion 122 from the front side of the vehicle. However, the present invention is not limited to the above specific embodiment. It is possible to provide a part exclusively used for the cover member so as to form the suction chamber 140.

Further, the suction opening portion 122 may be formed at the first pillar portion, the second pillar portion or both the beam members 110, the panel chamber wall 124 may be formed around the suction opening portion 122, and the labyrinth structure may be composed of the panel chamber wall 124 and the protruding portion formed on the panel.

While the invention has been described by reference to specific embodiments chosen for purposes of illustration, it should be apparent that numerous modification could be made thereto by those skilled in the art without departing from the basic concept and scope of the invention.

What is claimed is:

1. A front end structure of a vehicle comprising a front end panel (100) which is arranged at a front end portion of the vehicle and divides the front end portion into an engine compartment, into which an internal combustion engine is incorporated, and an outside of the engine compartment, the front end panel (100) comprising:

a suction opening portion (122) in which air sucked into the internal combustion engine flows and which connects the engine compartment with the outside of the engine compartment; and a cover member (300, 410, 151) for forming a suction chamber (140) in which the sucked air is filled, the cover member being arranged on the front side of the suction opening portion (122) in such a manner that the cover member covers the suction opening portion (122) from the front side of the vehicle, wherein the suction chamber (140) is in communication with the outside of the suction chamber (140) in a direction perpendicular to the vertical direction of the vehicle, a communicating passage (141) to connect the suction chamber (140) with the outside of the suction chamber (140) is formed into a labyrinth structure composed of a first wall portion formed on the cover member (300, 410, 151) and extending towards the front end panel and a second wall portion formed around the suction opening portion on the front end panel (100) and extending toward the cover member to overlap a portion of the first wall portion, a first space being formed between the front end panel and an end of the first wall, a second space being formed between the cover member and an end wall of the second wall portion and the suction chamber includes a suction opening that is connected to an air cleaner.

2. A front end structure of a vehicle according to claim 1, wherein the suction chamber is a space extending in the upward and downward directions of the vehicle.

3. A front end structure of a vehicle according to claim 1, wherein the suction opening is provided on a wall of the front end panel extending in the vertical direction.

4. A front end structure of a vehicle comprising: a front end panel (100) which is arranged at a front end portion of the vehicle and divides the front end portion into an engine compartment, into which an internal combustion engine is incorporated, and an outside of the engine compartment; a decoration grill (300) for forming a decoration profile of the front end portion of the vehicle, arranged on the front side of the front end panel (100); and a bumper cover (410) to cover a bumper reinforcement (400) for absorbing a shock, the front end panel (100) comprising:

a suction opening portion (122) in which air sucked into the internal combustion engine flows and which communicates the engine compartment with the outside of the engine compartment; and a suction chamber (140) in which air is filled, formed on the front side of the suction opening portion (122) when the suction opening portion (122) is covered with the decoration grill (300) from the front side of the vehicle, wherein the suction chamber (140) is in communication with the outside of the suction chamber (140) in a direction perpendicular to the vertical direction of the vehicle, a communicating passage (141) to connect the suction chamber (140) with the outside of the suction chamber (140) is formed into a labyrinth structure composed of a first wall portion formed on the decoration grill (300) and extending towards the front end panel, a second wall portion formed around the suction opening portion on the front end panel (100) and extending toward the decoration grill to overlap a portion of the first wall portion, a first space being formed between the front end panel and an end of the first wall, a second space being formed between the decoration grill and an end wall of the second wall portion and the bumper cover (410), and the suction chamber includes a suction opening that is connected to an air cleaner.

5. A front end structure of a vehicle according to claims 4, wherein the decoration grill (300), the front end panel (100) and the bumper cover (410) are made of resin.

6. A front end structure according to claim 4 wherein the suction chamber is located between the engine compartment and the bumper reinforcement.

7. A front end structure according to claim 6 wherein the suction chamber is located above the bumper reinforcement.

8. A front end structure of a vehicle comprising a front end panel (100) which is arranged at a front end portion of the vehicle and divides the front end portion into an engine compartment, into which an internal combustion engine is incorporated, and an outside of the engine compartment, the front end panel (100) comprising:

a suction opening portion (122) in which air sucked into the internal combustion engine flows and which connects the engine compartment with the outside of the engine compartment; and a cover member (300, 410, 151) for forming a suction chamber (140) in which the sucked air is filled, the cover member being arranged on the front side of the suction opening portion (122) in such a manner that the cover member covers the suction opening portion (122) from the front side of the vehicle, wherein the suction chamber (140) is communicated with the outside of the suction chamber (140) from one of a right side and a left side of the vehicle, and a communicating passage (141) to connect the suction chamber (140) with the outside of the suction chamber (140) is formed into a labyrinth structure composed of a first wall portion formed on the cover member (300, 410, 151) and extending towards the front end panel and a second wall portion formed around the suction opening portion on the front end panel (100) and extending toward the cover member to overlap a portion of the first wall portion, a first space being formed between the front end panel and an end of the first wall, a second space being formed between the cover member and an end wall of the second wall portion.

* * * * *